United States Patent Office 2,975,034
Patented Mar. 14, 1961

2,975,034

ELECTROLYSIS OF FUSED SALTS

Harry Rowland Leech and William Harold Wilson, Widnes, England, assignors to Imperial Chemical Industries Limited, London, England, a corporation of Great Britain No Drawing. Filed May 22, 1958, Ser. No. 736,970

Claims priority, application Great Britain May 31, 1957

6 Claims. (Cl. 23—215)

This invention relates to an improved step in a process for the electrolytic manufacture of fluorine wherein the hydrogen fluoride impurity in the fluorine is removed.

Fluorine produced by the electrolysis of molten mixtures of potassium fluoride and hydrogen fluoride is contaminated with hydrogen fluoride. The concentration of hydrogen fluoride contaminant in the fluorine depends on various factors, particularly, the concentration of hydrogen fluoride in the electrolyte and the electrolyte temperature. For example, in the electrolysis of a molten mixture of potassium fluoride and hydrogen fluoride of approximate composition KF.2HF at a temperature of the order of 80° C. to 100° C., the concentration of HF in the fluorine may be up to 10% by volume or occasionally even higher.

It has been proposed that the hydrogen fluoride contaminant should be removed by refrigeration, but removal of a major proportion of the hydrogen fluoride from the fluorine by this method would call for very low temperature conditions and this involves considerable expense. The generally accepted method of removing hydrogen fluoride from fluorine appears to be by absorption by sodium fluoride. Thus one method which has been proposed and which utilises this principle involves heating preformed sodium bifluoride (NaF.HF) pellets to give porous sodium fluoride pellets. The fluorine containing HF is passed through a series of absorption chambers containing the porous pellets heated to a temperature of at least 85° C. and preferably not lower than 100° C. so that by this means the porous sodium fluoride pellets do not swell and disintegrate and absorption beyond the stage where NaF.HF is formed is prevented. Thereafter the gas may be passed through one or more chambers containing more of said sodium fluoride pellets maintained at temperatures below 85° C. to remove residual HF. The spent pellets may be heated to a temperature greater than 100° C. and, preferably, in the range 300° C. to 500° C. in a stream of inert gas to regenerate the said porous sodium fluoride pellets. Hydrogen fluoride is optionally recovered from the inert gas in which it is entrained but this calls for low temperature conditions and as aforesaid this is an expensive procedure. The method described also involves considerable expense in preforming the pellets and in heating them during both absorption and regenerative stages. Moreover the capacity of sodium fluoride for absorbing hydrogen fluoride decreases with increase of temperature and since the first series of chambers is maintained at a temperature of at least 85° C. the sodium fluoride is in fact being employed at a temperature at which its absorptive capacity for hydrogen fluoride is reduced.

The problem of removing hydrogen fluoride vapour from fluorine is very similar to a problem which is frequently met in industry, namely, that of removing solvent vapours from a stream of gases. This problem is readily dealt with if a relatively involatile liquid can be found which selectively absorbs the vapour and which does not react with the gases. In this case a circulatory system can be operated. The contaminated gases pass up a scrubbing tower countercurrent to the absorbing liquid. The liquid from the bottom of the tower is then subjected to a simple distillation to strip off the solvent vapours from the absorbent. The solvent vapours are recovered in a concentrated form and condensed to a liquid and the pure absorbent is recovered and passed back to the scrubbing tower.

It would be desirable to adapt this type of process to the purification of fluorine contaminated with hydrogen fluoride since the generally accepted process using sodium fluoride has a number of disadvantages not shared by the said process using a liquid absorbent. For example, no matter how the sodium fluoride process is operated there is the inconvenience involved in regenerating or renewing the absorbent, there is the trouble and expense involved in heating the sodium fluoride at elevated temperature, and there is the disadvantage that the process is essentially a batchwise operation and recovery of the hydrogen fluoride from the spent absorbent is difficult. It is obvious that any method relying on a solid absorbent for the hydrogen fluoride such as sodium fluoride still leaves something to be desired compared with a liquid absorbent, if only with regard to ease of handling the absorbents. Again the contaminated fluorine may be brought into more intimate contact with a liquid than a solid absorbent and usually it is simpler to regenerate, by heating, a liquid than a solid absorbent.

The problem has been to find a suitable absorbing liquid which in addition to having the other required properties referred to above must be inert to fluorine. The liquid would then have to be of low vapour pressure at ordinary temperatures, and therefore must have a long liquid range, good solvent properties for hydrogen fluoride and, of course, be inert to fluorine. Such a liquid is difficult to locate but we have now found that fluorosulphonic acid, contrary to expectations, is not attacked by fluorine. It might have been expected that fluorine would react with fluorosulphonic acid since perchloric acid, to which fluorosulphonic acid has many similarities, is known to react with fluorine to give fluorine perchlorates (see J.A.C.S. 1947, 69, 677). It might further have been expected that fluorine would react with fluorosulphonic acid since the electrolytic fluorination of fluorosulphonic acid itself has been stated to yield sulphuryl fluoride (see Z. anorg. Chem. 1955, 279, 289–299). Fluorosulphonic acid can absorb hydrogen fluoride and our discovery that, contrary to expectations, fluorosulphonic acid is not attacked by fluorine opens up the possibility of this acid being used to give a very much improved method of removing hydrogen fluoride from fluorine.

According to the present invention, therefore, we claim in a process for the electrolytic production of fluorine the step of removing hydrogen fluoride contaminant in fluorine which comprises bringing the contaminated fluorine into intimate contact with fluorosulphonic acid which absorbs the hydrogen fluoride and allows the fluorine to pass through the acid with substantially no attack on the acid, then removing hydrogen fluoride from the fluorosulphonic acid absorbent and returning the fluorosulphonic acid absorbent to the absorption zone.

Various means may be adopted to eliminate hydrogen fluoride from the spent or partially spent absorbent. As the boiling points of hydrogen fluoride and fluorosulphonic acid at 760 mm. Hg. pressure are approximately 19° C. and 164° C. respectively, and since hydrogen fluoride is lightly held by the absorbent one simple method is to strip out the hydrogen fluoride in a simple fractionation column. Again, the hydrogen fluoride need not necessarily be removed as such from the spent absorbent since by utilising the known reaction of sulphur trioxide with hydrogen fluoride sulphur trioxide may be reacted with said absorbent containing hydrogen fluoride so that it reacts with substantially all the hydrogen fluoride present to form more fluorosulphonic acid, the required amount of fluorosulphonic acid being then passed back to the absorption zone. Again, to make up for small losses which normally occur in the handling of fluorosulphonic acid sufficient amount of sulphur trioxide may be reacted with the spent absorbent containing hydrogen fluoride to make up such losses and then after stripping out hydrogen fluoride in the fractionation column fluorosulphonic acid is passed to the absorption zone. Alternatively the spent or partially spent absorbent is heated in a fractionation column to strip off a proportion of hydrogen fluoride and the absorbent containing a lesser proportion of hydrogen fluoride is then treated with sulphur trioxide to react with the remaining hydrogen fluoride to make up for normal losses of fluorosulphonic acid, the fluorosulphonic acid being then returned to the absorption zone.

In practice a circulatory system can be set up and according to one useful method of carrying out the invention fluorine contaminated with HF is passed upwardly through an absorption tower where it meets downcoming fluorosulphonic acid introduced through spray jets situated near the top of the tower. Fluorine is removed near the top of the tower and freed from entrained fluorosulphonic acid which may be present in the form of droplets or mist. Subnormal, normal or slightly elevated temperatures may be maintained in the absorption zone, for instance temperatures in the range −25° C. to 40° C. Good results may, in fact, be obtained with temperatures below the prevailing atmospheric temperature. The fluorosulphonic acid containing hydrogen fluoride passes from the bottom of the tower to a fractionation column to strip out HF and the fluorosulphonic acid thus freed from HF is returned to the absorption zone. The hydrogen fluoride stripped out in the fractionation column is condensed and returned to a cell wherein it is utilised in the manufacture of fluorine.

The process of the present invention is simply and easily controlled. The absorbent being a liquid is easily handled, permits intimate contact with the contaminated fluorine, and the spent absorbent may be easily regenerated and returned to the scrubbing system.

The following examples illustrate but do not limit the invention.

Example 1

Fluorine contaminated with HF was passed upwardly through a tower packed with nickel turnings countercurrent to a dropwise flow of anhydrous fluorosulphonic acid. Fluorine leaving the top of the tower was passed through a vessel containing sodium fluoride in order to determine the residual HF content of the fluorine. Fluorosulphonic acid contaminated with HF collecting at the bottom of the absorption column was freed from HF in a simple distillation column so that the purified fluorosulphonic acid could be passed back to the reaction zone. Results of the run are given below.

| Temperature of absorption | Duration (hours) | $F_2$ (l./hr.) | HF in inlet $F_2$, Percent v./v. | HF in outlet $F_2$, Percent v./v. |
|---|---|---|---|---|
| 20° C | 5 | 12.6 | 15.4 | 0.5 |
| 20° C | 7 | 12.6 | 7.4 | 0.5 |
| 20° C | 6 | 12.6 | 7.4 | 0.5 |
| 20° C | 5 | 16.8 | 16.2 | 0.3 |

Example 2

Contaminant HF in fluorine was removed using the apparatus and procedure described in Example 1. The reaction conditions and results obtained are given in the table below.

| Temperature of absorption | Duration (hours) | $F_2$ (l./hr.) | HF in inlet $F_2$, Percent v./v. | HF in outlet $F_2$, Percent v./v. |
|---|---|---|---|---|
| −20° C | 5 | 16.8 | 15 | 0.4 |
| −20° C | 5 | 16.8 | 15 | 0.2 |
| −20° C | 5 | 16.8 | 15 | 0.1 |
| −20° C | 5 | 16.8 | 15 | 0.3 |

What we claim is:

1. In a process for the electrolytic production of fluorine the step of removing hydrogen fluoride contaminant in fluorine which comprises bringing the contaminated fluorine into intimate contact with fluorosulphonic acid which absorbs the hydrogen fluoride and allows fluorine to pass through the acid with substantially no attack on the acid, then removing hydrogen fluoride from the fluorosulphonic acid and returning the fluorosulphonic acid absorbent to the absorption zone.

2. The step according to claim 1 in which the spent or partially spent fluorosulphonic acid absorbent is heated in a fractionation column to strip out hydrogen fluoride, the fluorosulphonic acid being then returned to the absorption zone.

3. The step according to claim 1 in which the spent or partially spent fluorosulphonic acid absorbent is reacted with sufficient sulphur trioxide to convert substantially all the hydrogen fluoride contaminant in the fluorosulphonic acid to give more fluorosulphonic acid, sufficient amount of fluorosulphonic acid being then returned to the absorption zone.

4. The step according to claim 1 in which the spent or partially spent fluorosulphonic acid absorbent is reacted with sulphur trioxide to form a sufficient amount of fluorosulphonic acid to make up for normal losses of fluorosulphonic acid the fluorosulphonic acid still containing HF being then passed to a fractionation column to strip off HF and the purified fluorosulphonic acid absorbent being then returned to the absorption zone.

5. The step according to claim 1 in which the spent or partially spent absorbent is heated in a fractionation column to strip off a proportion of hydrogen fluoride and the absorbent containing a lesser proportion of hydrogen fluoride is then treated with sulphur trioxide to react with the remaining hydrogen fluoride to make up for normal losses of fluorosulphonic acid, the fluorosulphonic acid being then returned to the absorption zone.

6. The step according to claim 1 in which the temperature maintained in the absorption zone is in the range −25° C. to 40° C.

References Cited in the file of this patent

UNITED STATES PATENTS

| 2,456,509 | Hopkins et al. | Dec. 14, 1948 |
| 2,702,233 | Mitchell et al. | Feb. 15, 1955 |